United States Patent [19]

McClive

[11] Patent Number: 5,501,482
[45] Date of Patent: Mar. 26, 1996

[54] WHEEL COUPLING FOR ATTACHING A VEHICULAR DEVICE TO A WHEEL OF AN AUTOMOTIVE VEHICLE

[76] Inventor: William J. McClive, 619 Elysian, Big Bear City, Calif. 92314

[21] Appl. No.: 127,763

[22] Filed: Sep. 28, 1993

[51] Int. Cl.⁶ ...................................................... B60D 1/00
[52] U.S. Cl. .................. 280/503; 280/460.1; 280/476.1; 280/501
[58] Field of Search ................................ 280/503, 460.1, 280/493, 495, 501, 767

[56] References Cited

U.S. PATENT DOCUMENTS

| | | | |
|---|---|---|---|
| 1,478,041 | 12/1923 | Lorenz | 280/503 |
| 3,583,728 | 6/1971 | Cornell | 280/503 |
| 3,814,464 | 6/1974 | Wardill et al. | 280/476.1 |
| 4,691,934 | 9/1987 | Tomse | 280/503 |
| 5,112,075 | 5/1992 | Tomse | 280/503 |

Primary Examiner—Mitchell J. Hill

[57] ABSTRACT

A wheel coupling for attaching a vehicular device to a vehicle wheel and having mounting brackets which are adapted for connection to selected lug bolts of a wheel to mount the coupling on the wheel and adjustable to permit mounting of the wheel coupling on wheels having different numbers of lug bolts and lug bolt spacings. A vehicular trailer hitch and snow/ice traction device embodying the wheel coupling, and a lug bolt gauge for aiding adjustment of the coupling to the proper configuation for different lug bolt numbers and spacings.

28 Claims, 6 Drawing Sheets

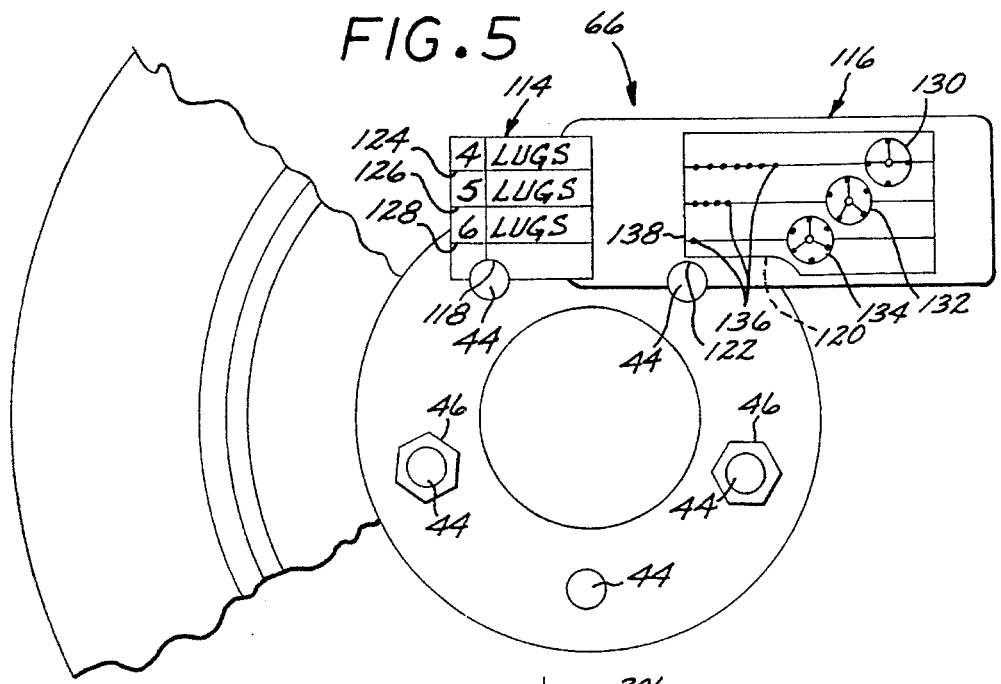
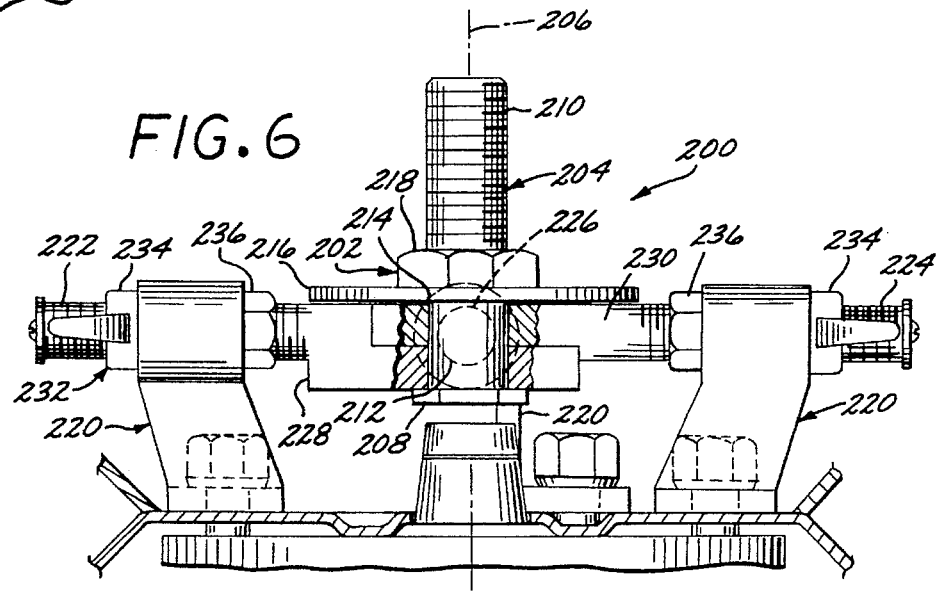
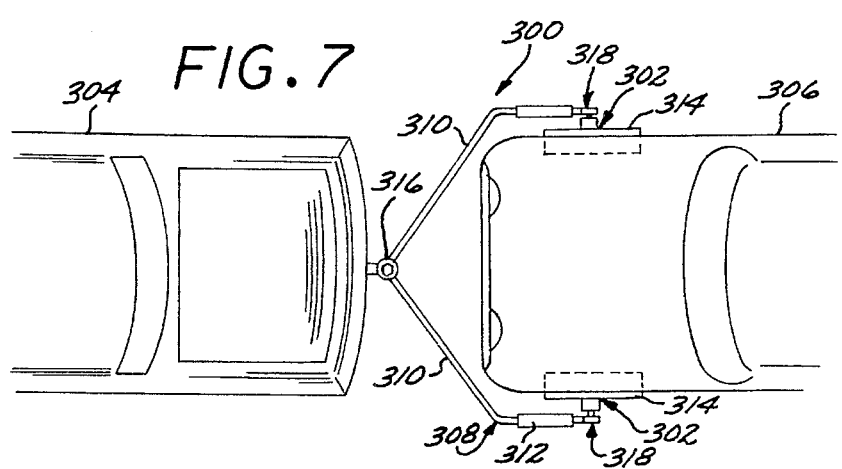

WHEEL COUPLING FOR ATTACHING A VEHICULAR DEVICE TO A WHEEL OF AN AUTOMOTIVE VEHICLE

Background of the Invention

1. Field of the Invention

This invention relates generally to acccessories for wheeled vehicles and more particularly to a novel adjustable wheel coupling to be mounted on a vehicle wheel for attaching a vehicular device to the wheel. The invention relates also to a novel gauge for aiding adjustment of the wheel coupling to the proper configuration for mounting on a particular wheel.

2 Discussion of the Prior Art

The adjustable wheel coupling of this invention has two primary uses or applications which are coupling a towed vehicle to a towing vehicle and attaching snow/ice traction devices to the wheels of an automotive vehicle. The wheel coupling will be described in the context of these, two uses. It is concievable, however, that the wheel coupling may be used for other purposes and thus should not be thought of as limit to the two primary uses mentioned.

The most common form of vehicle hitch for coupling a towed vehicle, such as a trailer, to a towing vehicle, such as an automobile, comprises a front hitch tongue on the towed vehicle, and a ball and socket coupling connecting the front end of the hitch tongue to the rear of the towing vehicle. U.S. Pat. No. 2,255,624 illustrates a trailer hitch of this kind. The ball and socket coupling between the two vehicles includes a coupling part, generally the coupling ball, mounted on the rear of the towing vehicle.

One way of mounting this coupling part on the towing vehicle involves rigidly attaching the part to the vehicle frame. In some cases, the coupling part is permanently attached to the towing vehicle frame. In other cases, the coupling part is removably fixed to a base part which is permanently secured to the towing vehicle frame, so that the coupling part can be removed from the towing vehicle when not in use. While providing a superior trailer hitch coupling, these methods of mounting the coupling part on the towing vehicle have two disadvantages which are relatively high cost and incapability of temporary use for coupling a trailer, such as a rental trailer, to a motor vehicle. Up to now, the only available way of coupling a trailer to a motor vehicle not equipped with a permanent trailer hitch has involved the use of a trailer hitch coupling including means, such as chains, clamps or the like, for releasably securing the attachment to the rear of the motor vehicle, The design and construction of most if not all modern automobiles, however, are such that there is no practical way of mounting such a hitch attachment on the automobiles.

British patent 653,996 and U.S. Pat. Nos. 3,175,845, 3,199,894, 3,232,586 and 3,717,364 disclose an alternative form of trailer hitch which can be quickly and easily mounted on most if not all modern automotive vehicles. The trailer hitches described in these latter patents, while differing in their specific structural details, are all characterized by a hitch frame, a pair wheel couplings rotatably mounted on the frame and adapted for attachment to two opposite wheels of one vehicle. (i.e either the towing vehicle or the towed vehicle), and means for connecting the frame to the other vehicle. In the hitch forms shown in the U.S. Pat. Nos. 3,175,845, 3,199,894, 3,232,586 and 3,717,364, the wheel couplings are attached to the rear wheels of the towing vehicle. In the British patent 653,996, the wheel couplings are attached to the front wheels of the towed vehicle.

The wheel couplings of these patented trailer hitches are designed for use on vehicles having conventional rotary wheel-supporting hubs mounting threaded studs called lug bolts which are spaced circumferentially about the rotation axes of the hubs and project through lug bolt holes in the central hub portions of the vehicle wheels. The wheels are normally secured to the hubs by lug nuts threaded on the lug bolts. The patented wheel couplings comprise disc-shaped coupling plates to be removably attached to the vehicle wheels, or more precisely to the rotary hubs on which the wheels are mounted, by so-called extension lugs that replace at least some of the standard lug nuts which normally secure the wheels to the hubs. Each extension lug has an axially inner threaded socket and an axially outer threaded stud on which is threaded a lug nut.

Each patented coupling plate is secured to its respective vehicle hub by at least three extension lugs. The inner socket end of each extension lug is threaded on a lug bolt of the hub after removal of the standard lug nut from the bolt. Each extension lug is tightened firmly against the central wheel cisc of the corresponding vehicle wheel to both firmly secure the extension lug to the lug bolt and cooperate with the remaining lug nuts, if any, and the other extension lugs to firmly secure the wheel to the vehicle hub. The outer threaded stud ends of the extension lugs extend through holes in the coupling plate and mount lug nuts which are tightened against the outer side of the plate to firmly secure the plate to the extension lugs. According to the preferred practice of the patented trailer hitch invention, the extension lugs used to secure each coupling plate to the respective vehicle wheel hub are at least three in number but lesser in number than the total number of lug bolts on the hub so that the vehicle wheel is secured to the hub by the extension lugs and, in addition, by a standard lug nut on at least one lug bolt.

The extension lugs of each patented wheel coupling mount the couplimg plate on the vehicle hub in coaxial relation to the hub rotation axis with the plate disposed in a plane transverse to the hub rotation axis and located beyond the axially outer extremity of the hub. The coupling plate includes coupling means for connecting the plate to the towed vehicle. Some of the wheel-coupled trailer hitches illustrated in the patents mentioned above, for example, include a generally U-shaped hitch frame having arms which straddle two laterally opposite wheels of one vehicle (i.e. the rear wheels of the towing vehicle in some hitch forms and the front wheels of the towed vehicle in another hitch form). The wheel coupling plates of these trailer hitches are connected to the hitch frame arms by rotary bearings which, in some cases, are swivel bearings. The hitch frame is connected to the other vehicle by a ball and socket coupling. In other wheel-coupled trailer hitches illustrated in the patents, the frame of the towed vehicle includes a pair of hitch arms which straddle the rear wheels of the towing vehicle. The coupling plates of the wheel couplings are connected to these hitch arms by rotary bearings.

Wheel-coupled trailer hitches of the kind discussed above have certain advantages over conventional trailer hitches in addition to the advantage mentioned earlier. These additional advantages are fully explained in the patents and thus need not be repeated here.

The design, manufacture, and use of wheel-coupled trailer hitches involve one problem with which the present invention is concerned. This problem results from the fact that different makes, types, models, and possibly model years of vehicles (both motor vehicles and trailers) utilize different numbers of lug bolts and different lug bolt arrangements for mounting wheels on the rotary wheel hubs of the vehicles. For example, some vehicles have four lug bolts for securing each wheel to its rotary hub, other vehicles have five lug bolts for each wheel, and yet other vehicles use six lug bolts for each wheel. While the lug bolts on at least most vehicles are uniformly spaced circumferentially about and radially from the wheel rotation axes, both the circumferential spacing between adjacent lug bolts and the radial spacing of the lug bolts from the wheel rotation axis often varies from one make and/or type of vehicle to another. Accordingly, the design, manufacture, and use of wheel couplings of the kind to which this invention pertains involve the problem of adapting the wheel couplings to these different lug bolt numbers and arrangements.

The earlier mentioned patents suggest various ways of providing this adaptation. The wheel couplings illustrated in U.S. Pat. No. 3,175,845, for example, are designed for use with only a single lug bolt arrangement. Accordingly, each pair of these wheel couplings must be specially designed and manufactured for use with a particular number of lug bolts (four lug bolts in the case of the illustrated couplings) as well as a particular circumferential spacing between adjacent lug bolts and a particular radial spacing between the lug bolts and the wheel rotation axis. The wheel couplings illustrated in U.S. Pat. Nos. 3,232,586 and 3,717,364, like the wheel couplings of U.S. Pat. No. 3,715,845 are designed for use with a fixed number of lug bolts (five lug bolts in the case of the illustrated couplings), but have radially elongated lug bolt openings in the wheel coupling plates. Accordingly, these latter patented wheel couplings, while they must be specially designed and manufactured for use with a certain fixed number of lug bolts, they will accommodate a range of radial spacings between the lug bolts and the wheel rotation axis and a corresponding range in the circumferential spacing between adjacent lug bolts. The wheel couplings of U.S. Pat. No. 3,199,894 and British patent 653,996 have a relatively large number of lug bolt holes in the coupling plates which are arranged to accommodate several different lug bolt arrangements.

The patented wheel couplings discussed above have several disadvantages. One obvious disadvantage of those patented wheel couplings which accommodate only a fixed number of lug bolts is that these couplings would have to be marketed in either of two ways, both of which would be quite complicated, costly, and impractical. One of these ways would involve manufacturing and selling the couplings in response to the special order of each customer. Not only would this special order procedure be very complicated and costly from the manufacturing and marketing standpoint, but would also require each customer to accurately measure and specify in his special order the lug bolt measurements neccessary to the manufacture of wheel couplings with the proper lug bolt hole arrangement and spacings. The other way of marketing the patented wheel couplings designed for use with only a fixed number of lug bolts would involve the manufacture and handling of couplings for use with all the possible lug bolt arrangements and spacings. This would require the manufacture, handling, and stocking of such a large number couplings as to make this proceedure totally impractical.

The above disadvantages of the patented wheel couplings which are designed for only a fixed number of lug bolts are alievated to some extent by the wheel couplings disclosed in U.S. Pat. No. 3,199,894 and British Patent 653,996. These latter wheel couplings will accommodate a number of different lug bolt arrangements and spacings. However, even the wheel couplings disclosed in these patents have their disadvantages. In the first place, owing to space limitations and/or excessive structural weakening of the wheel coupling plates, it is not possible to provide the plates with enough lug bolt holes to accommodate all or even most of the many different lug bolt arrangements and spacings which have been used in the past, are now being used, and may be used in the future. As a consequence, marketing these latter wheel couplings would still require the manufacture, stocking, and handling of a number different wheel couplings with different coupling plate hole patterns and some special ordering procedures involving customer input regarding his particular lug bolt number and arrangement. Secondly, each customer would be presented with the difficult task of aligning the multi-hole coupling plates in the proper positions relative to vehicle lug bolts for mounting the plates on the wheels. Increasing the number of holes in the coupling plates to increase the number of lug bolt arrangements which the coupling will accommodate increases the difficulty of properly aligning the plate relative to the lug bolts.

A further disadvantage of all the patented wheel couplings resides in the fact that the couplings require the use of extension lugs to position their coupling plates axially beyond the outer ends of the wheel hubs or bearings. The trailer loads exerted on the couplings produces undesireable bending loads on the extension lugs which tend to bend the lug bolts and strip the threads of the lug bolts and extension lugs.

As will appear from the ensuing description, this invention provides an improved wheel coupling which is ideally suited for coupling a trailer hitch to a vehicle wheel and which eliminates the above and other disadvantages of the patented trailer hitch wheel couplings. As mentioned earlier, another use of the wheel coupling is mounting a snow/ice traction device on a vehicle wheel. This latter use of the wheel coupling will be discussed in connection with a certain wheel-mounted snow/ice traction device which is currently being sold under the name "Spikes-Spider".

This marketed traction device comprises three basic components which are a disc-like mounting plate, a traction unit proper removably and coaxially mounted on the plate, and a locking ring releasably securing the traction device to the plate. The mounting plate includes a central hub formed integrally with and projecting coaxially from the normally outer side of the plate. The mounting plate contains holes which are located to line up with the lug bolts on the wheel on which the traction device is to be mounted when the hub plate is coaxially positioned on the wheel. The traction unit includes a relatively flat annular hub plate having a central opening, and a plurality of generally L-shaped traction elements secured to and spaced circumferentially about the perimeter of the hub plate. The traction unit is removably positioned on the mounting plate with the hub of the mounting plate projecting through the opening in the traction unit hub plate and with the normally inner side of the hub plate seating against the outer side of the mounting plate. The locking ring is removably secured to the hub of the mounting plate and serves to releasably secure the traction unit to mounting plate. Each traction element of the traction unit has a radial arm rigidly fixed to and extending radially out from the traction unit hub plate and a traction arm extending laterally inward from the outer end of the radial arm. The traction arms of the several traction elements extend inwardly beyond the inner side of the mounting plate and mount traction studs.

The traction device is mounted on a vehicle wheel by first removing the standard lug nuts which normally hold the wheel on the vehicle and replacing these standard lug nuts by special lug nuts. These special lug nuts are threaded at one end on the wheel lug bolts to secure the wheel to the wheel hub and have outer ends which extend beyond outer ends of the lug bolts and contain threaded axial sockets. The traction device is secured to the wheel by mounting bolts which are inserted through the holes in the mounting plate of the traction device and threaded into the outer sockets of the special lug nuts. Spacers are mounted on these bolts between the wheel and mounting plate to the hub plate axially beyond the outer end of the wheel hub. The traction device is constructed and arranged so that when thus mounted on a vehicle wheel, the traction arms of the device extend laterally inward across the circumference of the wheel tire in close proximity to or in contact with the tire to increase traction when traveling over snow or ice.

While this existing traction device provides excellent traction when travelling over snow or ice, it does have one disadvantage. This disadvantage resides in the fact that the traction device, like some to the patented trailer hitch wheel couplings discussed earlier, are designed to fit only one particular vehicle lug bolt arrangement. According the traction device presents the same problems as discussed earlier in connection with the patented wheel couplings.

BRIEF DESCRIPTION OF THE INVENTION

This invention provides an adjustable wheel coupling of the character described whose primary uses are attachment of a vehicle hitch and attachment of a snow/ice traction device, referred to generically herein as vehicular devices, to a vehicle wheel. The wheel coupling is adjustable in a manner which permits mounting of the coupling on most if not all conventional automotive and trailer wheels and thereby eliminates the above discussed and other disadvantages of the patented wheel couplings and the wheel mounting means of the currently marketed traction device.

Simply stated, the adjustable wheel coupling of the invention comprises a central coupling part having a coupling axis and a normally inner side transverse to the axis, mounting brackets spaced circumferentially about the coupling part and each containing a hole for receiving a vehicle lug bolt, and mounting means mounting the brackets on the central coupling part in a manner which permits at least one of the following bracket adjustments: (a) relative adjustment of the brackets about the coupling axis to adjust the relative angular positions of the brackets about the axis (referred to herein as bracket angular adjustment), and (b) independent adjustment of the brackets toward and away from the coupling axis to adjust the radial spacing between the lug bolt hole in each bracket and the coupling axis (referred to as bracket radial adjustment). The number of mounting brackets on the wheel coupling is preferably at least three and less than the mumbet of lug bolts on the wheel on which the coupling is to be mounted. In the preferred form of the wheel coupling, the coupling mounting brackets are three in number and have seating faces disposed in a common plane transverse to the coupling axis and offset beyond the normally inner side of the central coupling part.

The adjustable wheel coupling of the invention is mounted on a vehicle wheel by removing from the wheel, simultaneously or one at a time, a number of lug nuts equal to the number of mounting brackets on the wheel coupling. The lug bolts from which the lug nuts are removed should be selected so that these selected lug bolts are as uniformly spaced as possible. The wheel remains attached to its supporting hub by the remaining lug nut(s). The mounting brackets of the wheel coupling are then adjusted angularly about and/or radially of the central coupling part as neccessary to coaxially align the holes in the mounting brackets with the selected lug bolts from which the lug nuts are removed. Finally, the wheel coupling is placed on the wheel in a position wherein the selected lug bolts project through the holes in the coupling mounting brackets, and the lug nuts are replaced on these lug bolts to firmly secure the wheel coupling and the wheel to one another and to the wheel supporting hub.

In one wheel coupling embodiment described herein, two coupling mounting brackets, referred as angularly adjustable brackets, are independently adjustable about and relative to the central coupling part. The third mounting bracket, referred to as an angularly fixed bracket, is fixed to the central coupling part and thus has a fixed angular position relative to this coupling part. Relative adjustment of the brackets about the coupling axis is accomplished by adjustment of the two adjustable brackets relative to one another and to the third fixed bracket. All three brackets are independently adjustable radially of the central coupling part. In another described embodiment all of the mounting brackets are independently angularly adjustable relative to the central coupling part.

In certain described embodiments of the invention, the adjustable wheel coupling forms part of a vehicle hitch for coupling a towed vehicle, such as a trailer or automotive vehicle, to a towing vehicle, such as an automobile or truck. The vehicle hitch includes a generally U-shaped hitch frame having a pair of arms which straddle two laterally opposite wheels of one vehicle and adjustable wheel couplings rotatably mounted on these arms for attaching the arms to the wheels. One of these described vehicle hitches is a trailer hitch whose hitch frame arms straddle and are rotatably attached to the rear wheels of the towing vehicle by the wheel couplings on the frame arms. The hitch frame is connected by a ball and socket coupling to a hitch tongue on the towed trailer. The other described vehicle hitch is intended for towing an automotive vehicle and includes a generally U-shape hitch frame whose arms straddle the front wheels of the towed automotive vehicle and are rotatably attached to these front wheels by the wheel couplings on the frame arms. The hitch frame is connected by a ball and socket coupling to the rear of the towing vehicle.

In another described embodiment, the adjustable wheel coupling forms part of a snow/ice traction device to be mounted on a vehicle wheel. The illustrated traction device includes a traction unit similar but not identical to that of the currently marketed traction device described earlier, and an adjustable wheel coupling according to the invention form attaching the traction unit to a vehicle wheel.

As mentioned earlier, mounting a present wheel coupling on a vehicle wheel requires adjustment of the coupling mounting brackets to the proper angular positions about and radial distance from the coupling axis to align the holes in the wheel coupling mounting brackets with selected lug bolts on the wheel. According to another of its aspects, this invention provides index means on the wheel coupling for aiding adjustment of such bracket adjustment and a gauge which can be used in conjunction with the index marks by the person mounting the coupling on a wheel to locate the coupling brackets in the proper positions for the lug bolt arrangement and spacing on the wheel.

BRIEF DESCRIPTION OF THE DRAWINGS

FIG. 5 illustrates a lug bolt guage according to the invention for aiding adjustment of the wheel coupling mounting brackets to the proper positions for the lug bolts of the wheel on which the wheel coupling is to be mounted;

FIG. 6 is a side view of a modified wheel coupling according to the invention;

FIG. 7 illustrates a modified vehicle hitch embodying adjustable wheel couplings according to the invention for coupling a towed automotive vehicle to a towing automotive vehicle;

DESCRIPTION OF THE PREFERRED EMBODIMENTS

Figure 1:
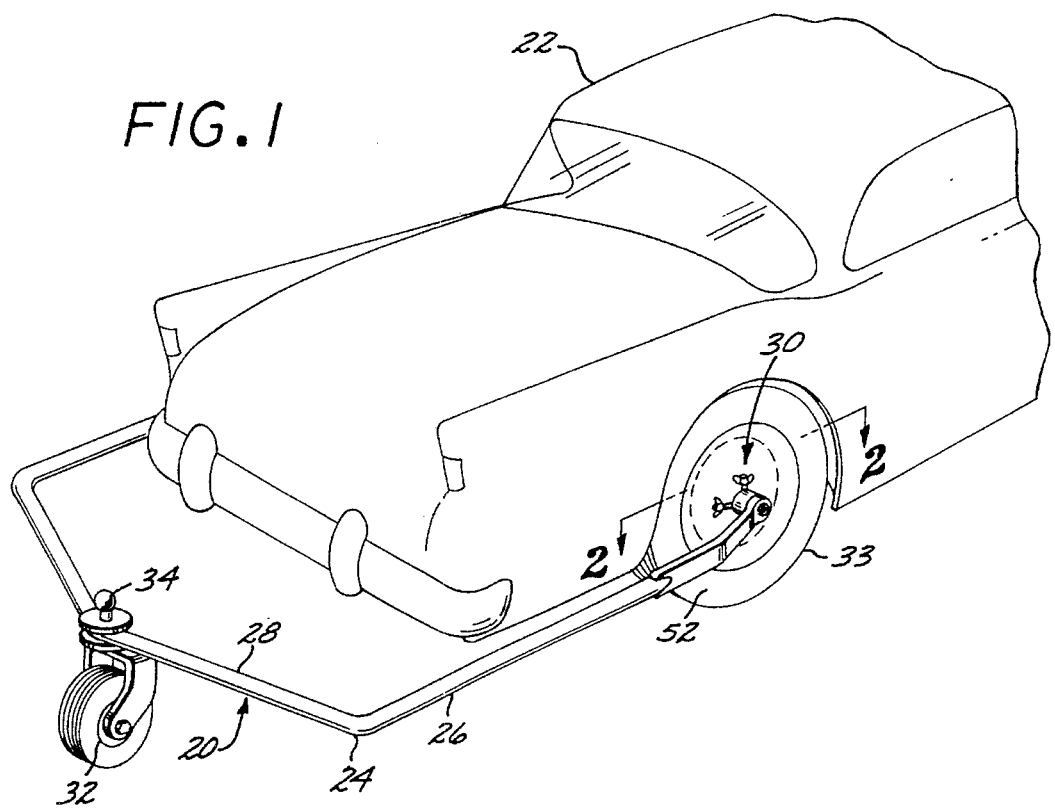
FIG. 1 is a perspective view of a vehicle hitch embodying adjustable wheel couplings according to this invention.

Turning now to these drawings and first to FIGS. 1–3a, there is illustrated a vehicle hitch 20 according to the; invention for connecting a towed vehicle, such as a travel trailer {not shown} to a towing vehicle 22, in this case a passenger automobile. The vehicle hitch 20 includes a generally U-shaped hitch frame 24 having a pair of generally parallel frame arms 26 and a bridge member 28 rigidly joining the arms at one end. Rotatably mounted on the free ends of the frame arms 26 are adjustable wheel couplings 30 (only one shown) according to this invention for attaching the frame arms to two laterally opposite wheels 33 of the towing vehicle 22. In the particular inventive embodiment illustrated, the hitch frame straddles, and the wheel couplings are connected to,the rear wheels of the towing vehicle. Rotatably mounted below the center of the frame bridge member 28 is a swivel wheel 32 for supporting the frame on the ground. On the top of the frame bridge member 28, directly over the swivel wheel 32, is a coupling ball 34 engagable in a coupling socket on the front end of the towed vehicle (not shown) for connecting the towed vehicle to the towing vehicle 22. Except for the wheel couplings 30 the vehicle hitch 20 is conventional.

Each rear wheel 33 of the towing vehicle 22 is removably mounted on a rotary wheel supporting hub 36 on the vehicle. This hub includes a circular hub body 38 having an outer face 40 transverse to the rotation axis of the hub, and a coaxial bearing portion 42 projecing outwardly beyond the hub face along the rotation axis. Rigidly fixed to and exending from the hub body 38 between the circumference of the body and the bearing portion 42 and parallel to the hub rotation axis are a number of lug bolts 44. Threaded on each lug bolt 44 is a lug nut 46. The lug bolts 44 are uniformly spaced circumferentially about the hub and the same radial distance from the rotation axis of the hub.

Each vehicle wheel 33 has a wheel disc 48 about the circumference of which is a rim 50. Mounted on this rim is pneumatic tire 52. Each wheel 33 is removably secured to its supporting hub 36 by lug bolts 44 and lug nuts 46 on the supporting hub. The lug bolts extend through holes in the wheel disc 48. The lug nuts are threaded on the lug bolts and are tightened to firmly secure the wheel to the wheel supporting hub 36 with the inner side of the wheel disc 48 seating against the outer face 40 of the supporting hub and the hub bearing 42 projecting through a center hole in the wheel wheel disc.

Figure 2:
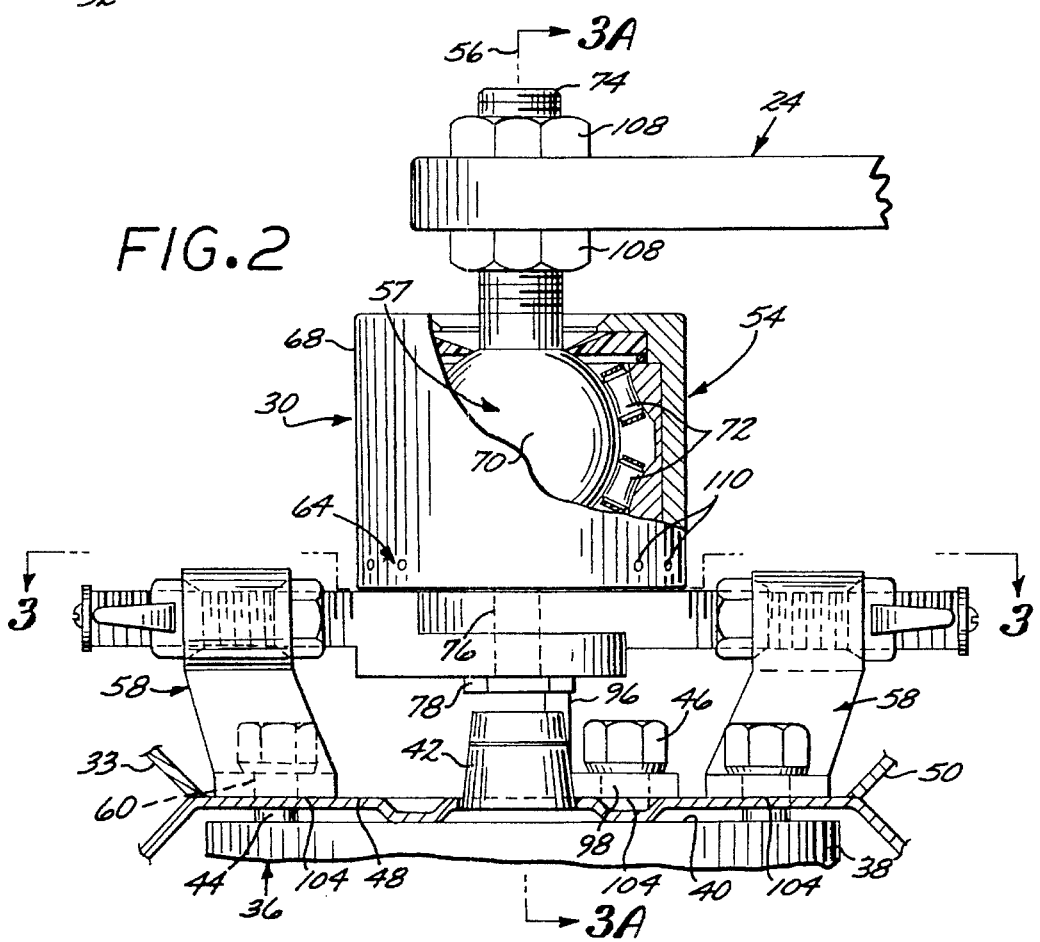
FIG. 2 is an enlarged view, partly in section, looking in the direction of the arrows on line 2—2 in FIG. 1.
Figure 3:
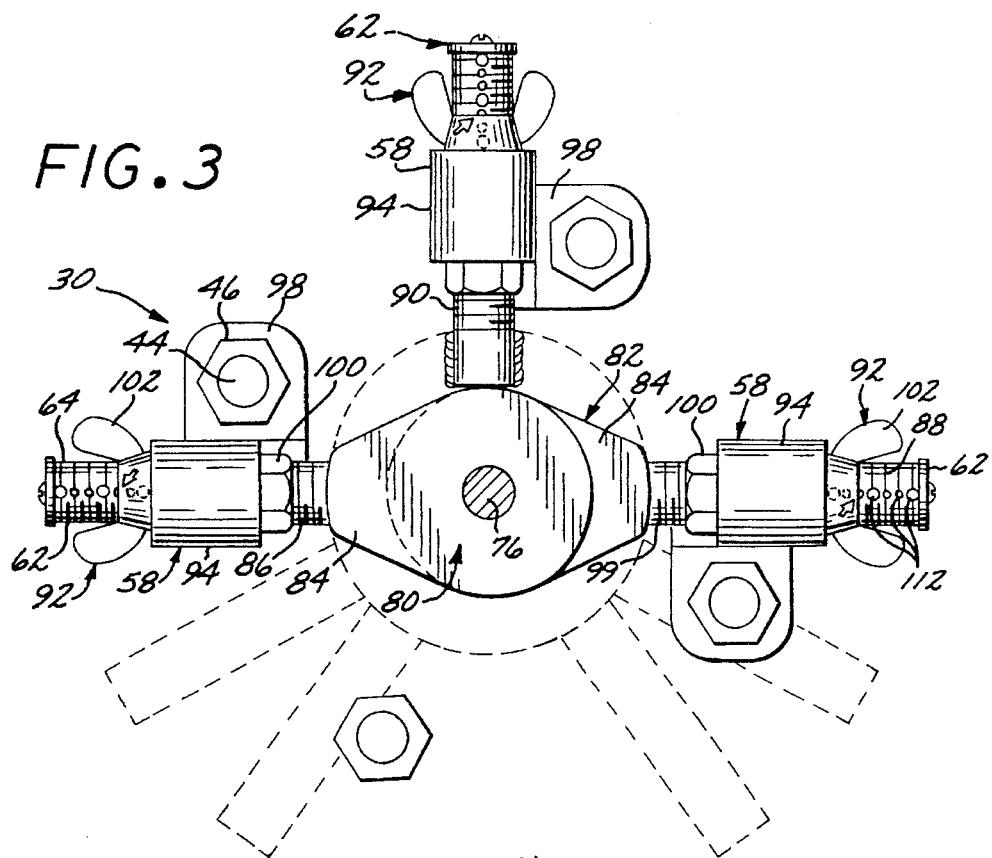
FIG. 3 is a section taken on line 3—3 in FIG. 2 illustrating, in broken lines, various adjusted positions of the coupling mounting brackets.
Figure 3A:
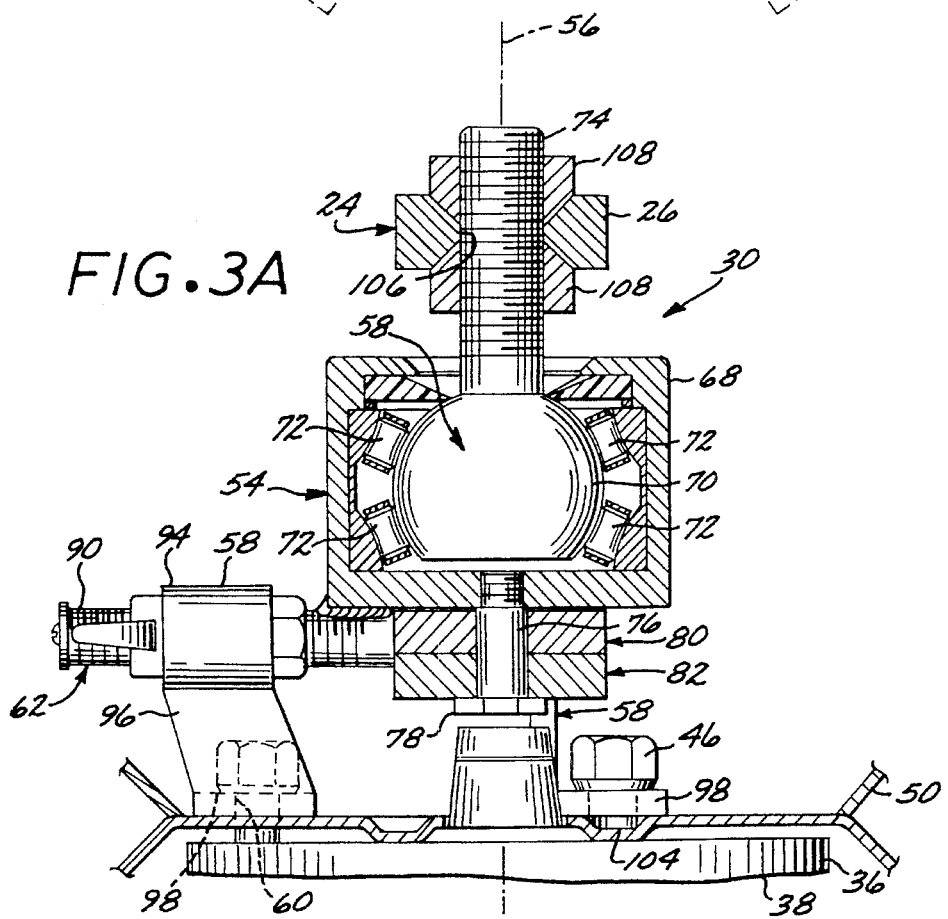
FIG. 3A is a section taken on line 3A—3A in FIG. 2.

The two wheel couplings 30 of the hitch frame 24 are identical so that a description of one will suffice for both. Referring particularly to FIGS. 2, 3, and 3A, the wheel coupling 30 comprises a central coupling part 54 having a coupling axis 56. This central coupling part includes coupling means 57 for attachment to a vehicular device to be connected to the towing vehicle 22. In the drawings, this vehiclular device is the hitch frame 24. Spaced circumferentially about the coupling part 54 are a number of wheel coupling mounting brackets 58. The preferred number of mounting brackets is three, as shown in the drawings.

Each mounting bracket includes connecting means, in this case a hole 60 for receiving, a vehicle wheel lug bolt 44. The mounting brackets 58 are mounted on the central coupling part 54 by adjustable mounting means 62 which are adjustable to effect at least one of the following bracket adjustments: (a) relative angular adjustment of the brackets about the coupling axis 56 to adjust the relative angular positions of the brackets about this axis, (b) radial adjustment of each bracket 58 toward and away from the coupling axis 56 to adjust the radial spacing between the hole 60 in the bracket and the coupling axis.

The adjustable wheel coupling 30 is mounted on a wheel 33 of the towing vehicle 22 by first removing the lug nuts 46 from selected lug bolts 44 of the wheel equal in number to the number of mounting brackets 58 on the wheel coupling. According to the preferred practice of the invention, the number of mounting brackets on the wheel coupling is at least three and less than the number of lug bolts on the wheel. The preferred number of mounting brackets is three, as shown in the drawings. Automobile wheels, on the other hand, normally have either four, five or six lug bolts. Accordingly, when mounting the wheel coupling 30 on a vehicle wheel, the wheel will remain secured to its hub 36 by at least one lug nut.

The selected lug bolts 44 from which the lug nuts 46 are removed for mounting the wheel coupling 30 on the wheel 30 should be chosen so that when there are more than one remaining lug bolt securing the wheel to its hub 36, these remaining lug bolts are as uniformly spaced about the hub as possible. The wheel coupling mounting brackets 58 are then adjusted angularly about and radially relative to the coupling axis 56 to align the bracket lug bolt holes 60 with the selected lug bolts from which the lug nuts 46 have been removed. Finally, the mounting brackets are placed over the selected lug bolts, and the lug nuts are replaced on these selected lug bolts and tightened to firmly secure the wheel and wheel coupling to one another and to the wheel hub 36.

It will be evident as the description proceeds that the mounting brackets 58 may be aligned with the wheel lug bolts 44 by visual observation only. According to one of its aspects, however, the invention provides index means 64 on the wheel coupling 30 and a wheel lug bolt guage 66 (FIG. 5) for aiding adjustment of the mounting brackets to the proper positions for any lug bolt arrangement.

Referring now in more detail to the illustrated adjustable wheel coupling 30, the central coupling part 54 comprises a hollow cylindrical body 68 coaxial with the coupling axis 56. Coupling body 68 has an open outer end and a closed inner end. The coupling means 57 of the central coupling part 54 comprises a spherical bearing member or ball 70 rotatably and swivelly supported in the coupling body 68 by a multiplicity of bearing rollers 72 within the body. Rigidly joined to the bearing ball 70 on an axis passing through the center of the ball is a threaded shaft or stem 74. This stem extends exteriorly of the bearing housing 68 through the open outer end of the housing for connection to the vehicular device (i.e. hitch frame 24) to be connected to the towing vehicle 22. The manner in which the stud is connected to the frame will be explained presently. Suffice it to say at this point, the coupling body 68, ball 70, bearing rollers 72, and threaded stem 74 together constitute a selfaligning swivel bearing, and the coupling part 68 forms the housing of this bearing.

The mounting means 62 which mount the mounting brackets 58 on the central coupling part 54 include a pivot shaft 76 rigidly fixed to the closed inner end of the bearing housing 68 coaxial with its axis 56. This pivot shaft may be threaded in or otherwise rigidly secured to the bearing housing and has a shoulder 78 at its free end. Rotatable on the pivot shaft 76 between its shoulder 78 and the bearing housing 68 are two flat collars 80, 82. As shown best in FIG. 3, each collar is generally pear-shaped when viewed along the coupling axis 56 and includes a radially projecting tapered portion 84 which narrows in the radially outward direction. Rigidly joined at one end to and extending outwardly from the outer extremities of the projecting portions 84 of the collars 80, 82 are two bracket mounting arms 86, 88, respectively. Rigidly joined at one end to and extending outwardly from the inner end of the bearing housing 68 is a third bracket mounting arm 90. The three bracket mounting arms have longitudinal axes located in a common plane transverse to the wheel coupling axis 56 and intersecting the axis at a common intersection point. The arms have inner ends adjacent the coupling axis and opposite outer ends. In the later claims, the arm 90 is is referred to, for easy reference, as "a first arm", and the arms 86, 88 are referred to as "additional arms".

From the above description, it is evident that the rigid joint at the inner end of arm 90 and the pivot shaft 76 on the closed end of the bearing housing 68 constitute connecting means in the bracket mounting means 62 which connect the inner ends of the bracket mounting arms 86, 88, 90 to the bearing housing, or coupling part as it is referred to in the later claims, and permit relative adjustment of the brackets 58 about the coupling axis 56 without disengagement of the brackets from the bracket mounting means. The bracket mounting arms 86, 88 are independently rotatable on the pivot shaft 76 relative to one another and to the bearing housing 68. The third bracket mounting arm 90 has a fixed position relative to the bearing housing and is rotatable with the housing relative to each of the arms 86, 88. The three bracket mounting arms 86, 88, 90 are thus independently rotatable about the wheel coupling axis 56 to any relative angular positions about the axis.

The three wheel coupling mounting brackets 58 are mounted on the bracket mounting arms 86, 88, 90, respectively, for independent adjustment of the brackets along their respective arms. This bracket adjustment occurs radially of the wheel coupling axis 56 and varies the radial spacing between the coupling axis and the lug bolt holes 60 in the brackets. Associated with each bracket are means 92 for releasably securing the bracket in adjusted position along its mounting arm. In the particular wheel coupling embodiment illustrated in FIGS. 1–3A, the bracket mounting arms 86, 88, 90 are threaded shafts. Each coupling mounting bracket 58 comprises a normally outer sleeve 94, a leg 96 having a normally outer end rigidly joined to the sleeve and an opposite, normally inner end, and a right angle flange 98 on the inner end of the leg. This flange contains the bracket lug bolt hole 60. The sleeve 94 of each bracket 58 is slidable along the respective bracket mounting arm 86, 88, 90 for adjustment of the bracket along the arm, radially of the coupling axis 56. The bracket arms and bracket sleeves constitute means in the bracket mounting means 62 which permit adjustment of the brackets 58 toward and away from the coupling axis without disengagement of the brackets from the mounting means. Each arm has a normally outer flat side 99 extending the length of the arm, and each bracket sleeve 94 has means (not shown) engaging this flat side of its respective arm for restraining the respective bracket against rotation about the longitudinal axis of the arm. The means 92 for releasably securing each bracket 58 in adjusted position along its respective mounting arm 86, 88, 90 comprises a nut 100 and a wing nut 102 threaded on the arm at the radially inner and radially outer sides, respectively, of the bracket sleeve 94. The brackets 58 have normally inner seating faces 104 at the normally inner sides of their flanges 98. When mounting the wheel coupling 33 on a vehicle wheel 33, the brackets occupy their illustrated normal positions about the longitudinal axes of their respective mounting arms 86, 88, 90. The brackets are substantially identical so that their seating faces 104 are disposed in a common plane transverse to the coupling axis 56 when the brackets occupy their illustrated normal positions.

The wheel coupling 30 is mounted on a wheel 33 of the towing vehicle 22 in the following way. Lug nuts 46 are first removed from a number of selected wheel lug bolts 44 equal to the number of the wheel coupling mounting brackets 58. In the case of the preferred wheel coupling illustrated, three lug nuts are removed. As noted earlier, the selected lug bolts from which the lug nuts are removed should be such that the remaining lug bolt(s) on the wheel are as uniformly spaced as possible. The later described gauge of FIG.5 indicates the proper lug bolts for mounting an adjustable wheel coupling according to the invention on wheels having various numbers of lug bolts. The wheel remains secured to its wheel supporting hub 36 on the vehicle by the lug nut(s) on the remaining lug bolt(s). The mounting brackets 58 of the wheel coupling are then adjusted radially of and circumferentially about the coupling axis 56 to align the lug bolt holes 60 in the brackets with the selected lug bolts 44 from which the lug nuts 46 were removed. The bracket securing means 92 are then tightened to secure the brackets in adjusted radial position, and the wheel coupling 30 is placed on the wheel 33 in a position in which the selected lug bolts extend through the bracket lug bolt holes 60 and the bracket seating faces 104 seat against the wheel wheel cisc 48. Finally, the removed lug nuts 46 are replaced on the selected lug bolts 44 and tightened to firmly secure the coupling and wheel to one another and to the wheel hub 36.

When the wheel coupling 30 is thus mounted on the vehicle wheel 33, the coupling axis 56 is aligned with the rotation axis of the wheel. The legs 96 of the mounting brackets 58 are sized in length to locate the inner shouldered end of the coupling pivot shaft 76 a small distance beyond the outer end of the wheel bearing 42 so as to prevent the wheel bearing from interferring with mounting of the wheel coupling. An adjustable wheel coupling 30 according to the invention is, of course, mounted on each rear wheel 33 of the towing vehicle.

As noted earlier and illustrated in the drawings, the arms 26 of the hitch frame 24, straddle the rear wheels 33 of the towing vehicle 22 which mount the adjustable wheel couplings 30 of the invention. The free ends of the frame arms contain aligned bores 106 (only one shown) which are sized in diameter to removably receive the threaded stems 74 of the self-aligning swivel bearings 57 on the wheel couplings 30 with a relative close fit. The vehicle hitch 24 is secured to the wheel couplings 30 by sliding the free ends of the hitch arms 26 over the bearing stems 74 and firmly securing the arms to the stems by nuts 108 threaded on the stems at opposite sides of the hitch arms.

Figure 4A:
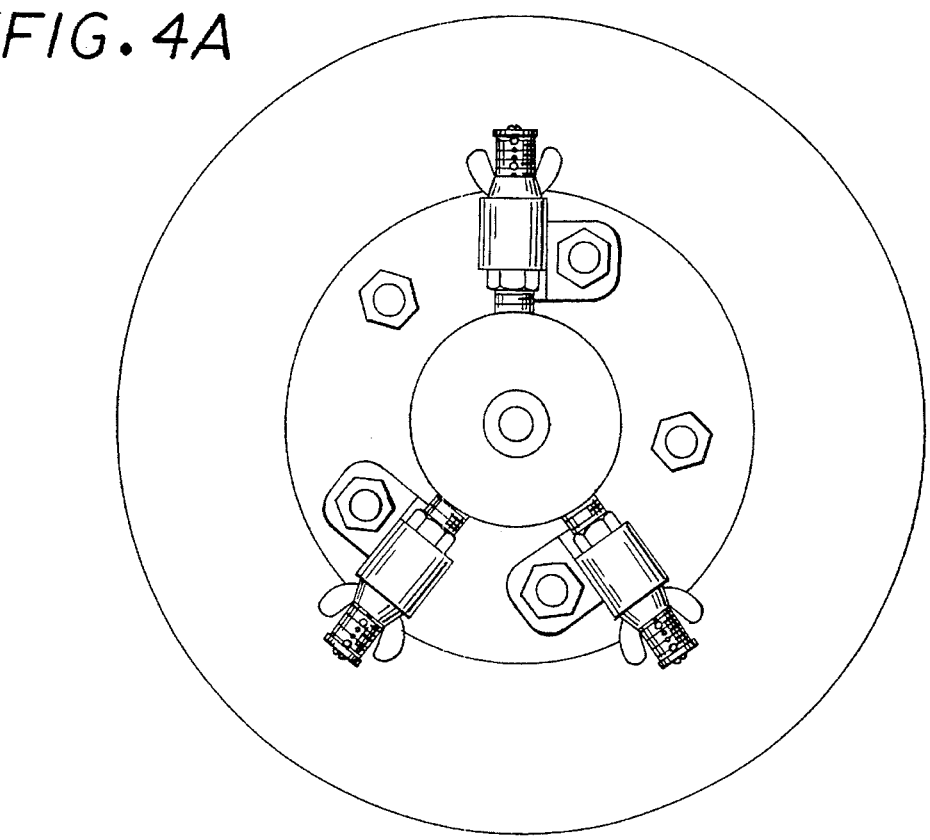
FIG. 4A illustrates a wheel coupling according to the invention mounted on a wheel having five lug bolts.
Figure 4B:
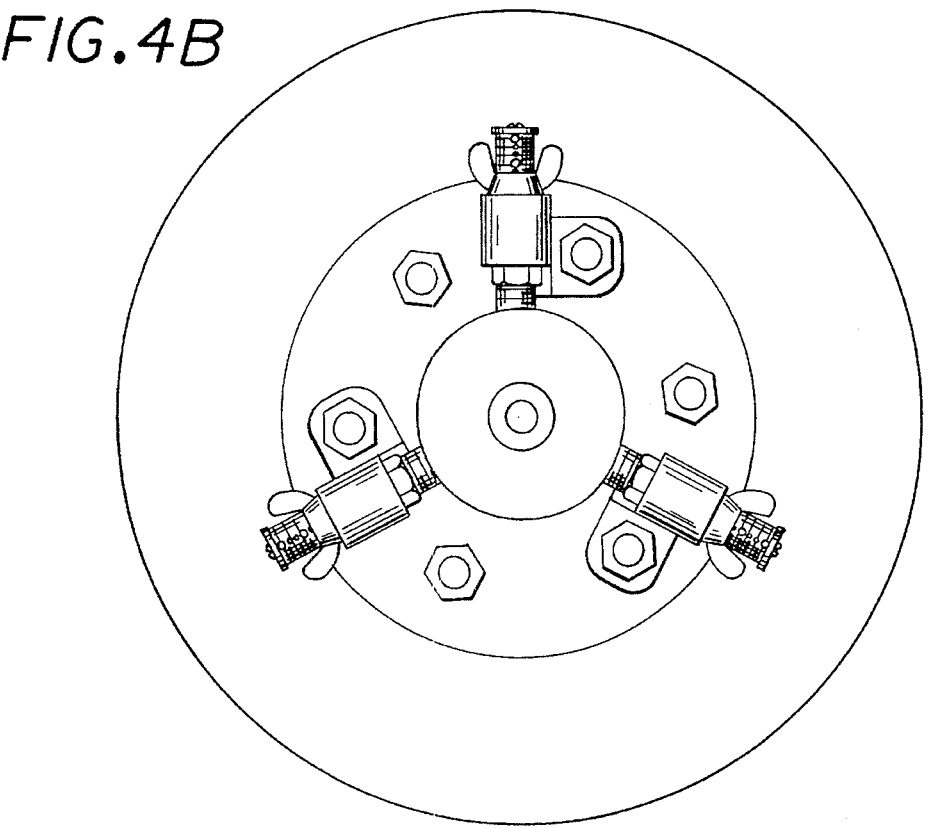
FIG. 4B is a view similar to FIG. 5A showing a wheel coupling according to the invention mounted on a wheel having six lug bolts.

The angular and radial adjustments of the mounting brackets 58 of the adjustable wheel coupling 30 accommodate mounting of the coupling on wheels having most if not all standard lug bolt arrangements and spacings including those of both domestic and foreign automotive vehicles. FIG. 4A, for example, illustrates the wheel coupling mounted on a wheel having five lug bolts. FIG. 6 illustrates the wheel coupling mounted on a wheel having six lug bolts. Most vehicles will have either four, five, or six lug bolts. As explained below, the index means 64 and guage 66 aid in positioning the brackets to match the particular lug bolt arrangement of the wheel on which the wheel coupling is to be mounted.

The index means 64 on the adjustable wheel coupling 30 comprise angular index marks 110 circumferentially spaced about the inner end of the bearing housing 68 and radial index marks 112 spaced along each bracket mounting arm 86, 88, 90. The angular index marks 110 indicate the angular positions in which the bracket mounting arms should be placed to locate the wheel coupling brackets 58 in the proper relative angular positions about the coupling axis 56 for various numbers of lug bolts, The radial index marks 112 indicate the positions in which the mounting brackets 58 should be placed along their respective mounting arms 86, 88, 90 for various radial lug bolt distances from the wheel rotation axis.

The illustrated radial index marks 112 are simple dots spaced along the outer flat sides 99 of the bracket mounting arms 86, 88, 90 adjacent the outer ends of these arms. These radial index marks are used by selectivly aligning the outer sides of the wing nuts 104 on the arms with the marks. The radial index marks 112 are situated at positions along the bracket mounting arms such that alignment of the radially outer sides of the wing nuts 104 with corresponding radial index marks 112 and radial outward abutment of the mounting bracket sleeves 94 against the wing nuts positions the mounting brackets 58 at the proper radial distance from the coupling axis 56 for a particular radial spacing between wheel lug bolts 44 and the wheel axis.

One way of using the radial index dots 112 to locate the brackets 58 in the proper radial positions for any particular lug bolt arrangement (i.e. lug bolt to wheel axis radial spacing) is as follows. First, the radially inner bracket lock nuts 102 are moved to the inner ends of their respective bracken mounting arms 86, 88, 90. The brackets 58 are then adjusted along their mounting arms by their wing nuts 104 to locate the brackets by visual observation in approximately the correct radial positions for the particular lug bolt arrangement at hand. The radial outer sides of the wing nuts will then be situated nearest to or in approximate alignment with the radial index marks 112 corresponding to the particular lug bolt arrangement. The wing nuts are then finally adjusted to align their outer sides with the nearest radial index marks. After placement of the wheel coupling 30 on the wheel 32 and any further adjustment of the wing nuts 104 neccessary to align the bracket holes 60 with the wheel lug bolts, the radially inner bracket lock nuts 102 are tightened against the bracket sleeves 94 to secure the mounting brackets 58 in their adjusted positions. The index marks or dots 110, 112 could be color coded or provided with other indicia to aid in adjusting the coupling to the proper setting for mounting it on a particlular wheel.

The gauge 66 of FIG. 5 is designed for use in conjunction with the index marks 110, 112 to aid in adjustment of the mounting brackets 58 to the proper settings for different wheel lug bolt numbers and spacings The operation of this gauge is based on the fact that the radial spacing of wheel lug bolts from the wheel axis, for any given number of lug bolts, is related to the center-to-center distance between each pair of adjacent lug bolts. Gauge 66 comprises an elongate inner part 114 and an outer part or slide 116. Entering one longitudinal edge of the inner part is a semi-circular notch 118 adjacent one end of the part and an elongage cutout 120 between the ends of the part. The slide 116 comprises a sleeve slidable on the stationarly part and having a semi-circular notch 122 in one longituding edge. This notch is normally aligned with the cutout 120 in the inner part 114.

Inscribed on the front surface of the inner part 114 are a number of longitudinal lines corresponding to different numbers of wheel lug bolts. The particular gauge illustrated has three longitudinal lines 124, 126, 128 corresponding to four, five, and six lug bolts, respectivley, as indicated by the numbers at the left ends of the lines in the drawings. At the right ends of the lines are icons 130, 132, 134 depicting the corresponding lug bolt arrangements and indicating the particular lug bolts to which the wheel coupling 30 should be secured. Spaced along the lines 124, 126, 128 are marks 136 corresponding to the radial index marks 112 on the mounting bracket mounting arms 86, 88, 90 of the adjustable wheel coupling 30. The front wall of the gauge slide 116 is opaque and has an edge 138 transverse to the length of the gauge and to the lug bolt lines 124, 126, 128. During endwise movement of the slide relative to the inner gauge part 114, the slide edge 138, which functions as a reference edge, moves along the lug bolt lines and across the marks 136.

Gauge 66 is used in this way when mounting the adjustable wheel coupling 30 on a vehicle wheel 33. The number of lug bolts 44 on the wheel 33 are counted and the count is compared with the icons 130, 132, 134 on the inner gauge part 114. The icon corresponding to the number of lug bolts on the wheel indicates which lug bolt of the wheel are to be used for attaching the coupling to the wheel. The lug nuts 46 are removed from one of these coupling attachment lug bolts and from one adjacent lug bolt to expose the two adjacent lug bolts. (After the gaging operation described below, the lug nut is replaced on said adjacent lug bolt}. The gauge is then placed on these two exposed lug bolts in the position shown in FIG. 5, wherein one lug bolt engages in the notch 118 of the inner gauge part 114 and the adjacent lug bolt engages in the notch 122 of the slide 116. The slide is adjusted endwise relative to the inner gauge part as neccessary to permit this engagement of the two adjacent lug bolts in the guage notches 118, 122. The reference edge 138 of the slide 116 will then intersect the lug bolt lines 124, 126, 128 at certain positions along these lines, and the slide will cover the gauge marks 136 located to the left of the reference edge in FIG. 5 and expose the gauge marks located to the right of the reference edge.

The radial index marks 112 on the individual bracket mounting arms 86, 88, 90 of the wheel coupling 30 are equal in number and located in the same positions along the arms so that the arms have corresponding radial index marks. The gauge marks 136 on each lug bolt line 124,126,128 are equal in number to the number of radial index marks 112 on each bracket mounting arm, and each guage mark corresponds to particular corresponding radial index marks 112 on the mounting bracket arms. The corresponding marks on the arms and guage are determined by counting the radial index marks from the outer ends of the coupling arms and counting the gauge marks from the right ends of the lug bolt lines 124, 126, 128 in FIG. 5.

The radial index marks 112 and gauge marks 136 are calibrated, that is these marks are spaced along the bracket mounting arms 86, 88, 90 on the wheel coupling 30 and the lug bolt lines 124, 126, 128 of the gauge 66, in such a way that (a) when the gauge is positioned on two adjacent lug bolts 44 of the vehicle wheel 33 on which the coupling 30 is to be mounted, as shown in FIG. 5, the reference edge 138 on the gauge slide 116 will intersect the lug bolt line 124, 126, or 128 which corresponds to the number of lug bolts on the wheel at or near one of the gauge marks 136 (referred to below as the "indicated gauge mark") along the respective lug bolt line, and (b) the radial index marks 112 on the bracket mounting arms 86, 88, 90 which correspond to the indicated gauge mark indicate the radial setting or approximate radial setting of the bracket wing nuts 104 along the arms to locate the coupling mounting brackets 58 at the correct radial distance from the coupling axis 56 for the particular wheel lug bolt arrangement involved. The brackets are positioned at these proper radial settings by first adjusting the wing nuts 104 along their bracket mounting arms to positions wherein the radially outer sides of the wing nuts are aligned with the radial index marks corresponding to the indicated gauge mark, and then threading the bracket lock nuts 102 outwardly along the bracket mounting arms to hold the mounting brackets 58 firmly against the preset wing nuts.

The index marks 136 on the gauge 66 may be established in various ways. In the preferred gauge embodiment illustrated, the index marks are established in the following way. The minimum and maximum radial spacings between the lug bolts 44 and wheel axis 56 of the various four, five and six lug bolt wheels on which the wheel coupling is designed to be mounted are determined in any convenient way, as by actual measurement or reference to wheel design specifications. The following procedure is then repeated for each of the four,five, and six lug bolt lines on the gauge 66. The gauge parts 114, 116 are set in first relative positions in which the spacing between the gauge notches 118, 122 equals the minimum radial lug bolt spacing for wheels having the number of lug bolts associated with the respective lug bolt line, and an index mark 136 is placed on the respective lug bolt line where it is crossed by the gauge reference edge 138. The gauge parts are then set in second relative positions in which the gauge notch spacing equals the maximum radial lug bolt spacing for wheels having the number of wheel lug bolts associated with the respective lug bolt line, and a second index mark 136 is placed on the lug bolt line where it is crossed by the reference edge. Additional index marks 136 are then placed on the lug bolt line between the first two marks at uniformly spaced intervals relative to one another and to the first two index marks. In the particular gauge 66 shown, each lug bolt line contains seven uniformly spaced index marks 136 forming an index row.

The radial index marks 112 on the wheel coupling 30, like the gauge index marks 136, may be established in various ways. The index marks on the preferred coupling illustrated are established in the following manner. The coupling wing nuts 102 are set to locate the coupling mounting brackets 58 in positions in which the radial spacing between the coupling axis 56 and the coupling bracket lug nut holes 60 equals the maximum radial spacing between the lug nuts and wheel axis of all of the wheels on which the coupling is designed to be mounted, and first index marks 112 are placed on the bracket arms 86, 88, 90 in line with the radially outer faces of the wing nuts. The coupling wing nuts 102 are then set to locate the coupling mounting brackets 58 in positions in which the radial spacing between the coupling axis 56 and the coupling bracket lug nut holes 60 equals the minimum spacing between the lug nuts and wheel axis of all of the wheels on which the coupling is designed to be mounted, and second index marks 112 are placed on the bracket arms 86, 88, 90 in line with the radially outer faces of the wing nuts. A number of additional uniformly spaced index marks 112 are then placed on the bracket arms between the first two index marks at positions equally spaced from one another and from the first two index marks. The total number of index marks 112 for each mounting bracket equals the total number of index marks 136 (seven index marks in the illustrated embodiment) on each lug bolt line of the gauge 66. The angular index marks 110 on the coupling 30 are located to designate the correct angular positions of the bracket mounting arms 86, 88, 90 for the coupling mounting lug nuts indicated by the icons 132, 134, 136 on the gauge 66.

FIG. 6 illustrates a modified adjustable wheel coupling 200 according to the invention which is identical to the coupling 30 of FIGS. 1–3A except for the following differences. The coupling 200 has a central coupling part. 202 including a shaft 204 on the coupling axis 206 having an inner bead 208, an outer threaded stem 210, and a cylindrical bearing portion 212 between the head and stem. The junction between the threaded stem 210 and bearing portion 212 forms an annular shoulder 214 facing axially outward toward the outer end of the stem. Positioned on the threaded stem 210 is a washer 216 which seats against the shoulder 214 and a nut 218 which is tightend against, the washer to clamp the washer firmly against the shoulder and thereby rigidly secure the washer to the shaft 204, The threaded stem 210 provides a coupling means on the coupling part 202 for connecting the wheel coupling to a vehicular device (not shown in FIG. 6).

The wheel coupling 200 has three identical mounting brackets 220 connected to the central coupling part 202 by mounting means including three bracket mounting arms 222, 224, 226. The radially inner ends of the bracket mounting arms 222, 224 are rigidly joined to collars 228, 230, respectively, rotatable on the bearing portion 212 of the central shaft 204 between the shaft head 208 and washer 216. The radially inner end of the third mounting arm 226, which corresponds to mounting arm 90 in FIGS. 1–3, is rigidly joined to the washer 216 and hence to the central coupling part 202. The mounting brackets 220 are adjustable along their respective mounting arms 222, 224, 226 and are secured in adjusted positions along the arms by means 232 including wing nuts 234 at the outer sides of the brackets and lock nuts 236 at the inner sides of the brackets.

The wheel coupling 200 includes angular adjustment index marks and radial adjustment index marks identical to the angular index marks 110 and radial index marks 112 on the adjustable wheel coupling 30. The angular index marks on the coupling 200 awe located on the upper side of outer side of the washer 216 (the upper side of the washer in FIG.6) and hence are not visible in FIG.6. These angular index marks are circumferentially spaced about the upper side of the washer in the same way as the angular index marks 110 ate spaced about the bearing housing 68 of coupling 30 to designate various angular positions of the bracket mounting arms 222, 224 relative to the central coupling part 202 and its fixed bracket mounting arm 226 for different wheel lug bolt arrangements, as explained in connection with the earlier wheel coupling 30. The radial index marks on the coupling 200 are spaced along the outer sides of the bracket mounting arms 222, 224, 226 (the Upper sides of the arms in FIG.6) and hence are not visible in FIG. 5. These radial index marks are spaced along the bracket mounting arms in the same manner as the radial index marks 112 are spaced along the bracket mounting arms 86, 88, 90 of the coupling 30. These index marks on the wheel coupling 200 may be used in conjunction with the gauge 66 of FIG. 5, in the same manner as described earlier in connection with FIG. 5, to aid angular and radial adjustment of the mounting brackets 220 to the proper angular and radial positions for a particular wheel lug bolt arrangement. From the foregoing description, it is evident that the adjustable wheel coupling 200 is adjusted and mounted on a vehicle wheel in the same manner as described in connection with the adjustable wheel coupling 30.

Figure 8:
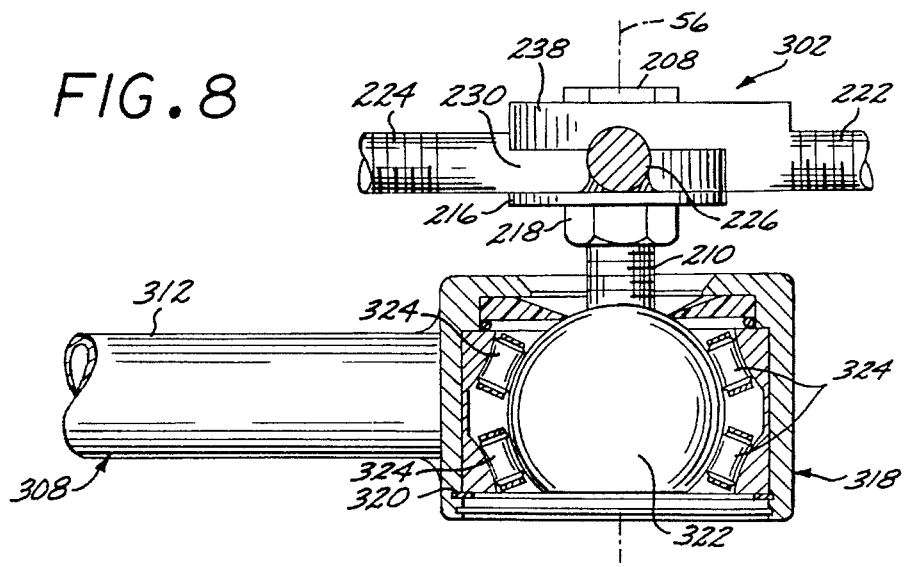
FIG. 8 is an enlarged section through a rotary and swivel bearing by which each adjustable wheel coupling in FIG. 7 is rotatably connected to its respective hitch frame arm.

FIGS. 7 and 8 illustrate a vehicle hitch 300 including wheel couplings 302 according to the invention connecting a towing vehicle 304 to a towed vehicle 306, in this case an automotive vehicle, The vehicle hitch 300 comprises a hitch frame 308 including a pair of frame members having forwardly convergent, normally front end portions 310 which are rigidly joined to one another at their front ends and normally rear end portions or arms 312 which substantially parallel one another and straddle the front wheels 314 of the towed vehicle 306. The front end of the hitch frame 300 is connected to the rear of the towing vehicle 304 by a conventional ball and socket coupling 316. The rear frame arms 312 mount the adjustable wheel coupling 302.

The wheel couplings 302 may comprise any adjustable wheel couplings according to the invention. The particular wheel couplings 302 shown, however, are identical to the wheel coupling 200 of FIG. 6 are thus shown in fragmentary fashion only. Also, for convenience, the various parts of the wheel coupling 302 which are shown in FIG. 8 are designated by the same reference numerals as their corresponding parts in FIG. 6. From this discussion, it will be understood that the wheel couplings 302 are mounted on the front wheels 314 of the towed vehicle 306, preferably with the aid of the gauge 66, in the same manner as the earlier described wheel couplings 30 and 200. When thus mounted on the front wheels, the axis 56 of each coupling is aligned with the rotation axis of the respective wheel.

At the free rear end of each arm 312 of the vehicle hitch frame 308 is a self-aligning swivel bearing 318. This bearing includes a housing 320 having an outer closed end and an open inner end. Within the bearing housing 320 is a swivel bearing member or ball 322 and bearing rollers 324 which support the ball within the housing for rotation of the ball in any direction about its center point. The two swivel bearings 318 are aligned on a common axis transverse to the frame arms 312 and passing through the centers of the bearing balls 322. Each bearing ball contains a threaded socket in which is threaded the outer free end of the stem 210 of tins adjacent wheel coupling 320 so as to firmly join the ball and stem.

From the foregoing description, it is evident that the vehicle hitch 300 connects the towing vehicle 304 to the front wheels 314 of the towed automotive vehicle 306. When the automotive vehicle 306 is being towed, the vehicle hitch causes the front wheels of the towed vehile to turn with the towing vehicle in a manner such that the towed vehicle tracks behind the towing vehicle during cornering as well as on the straight away.

Figure 9:
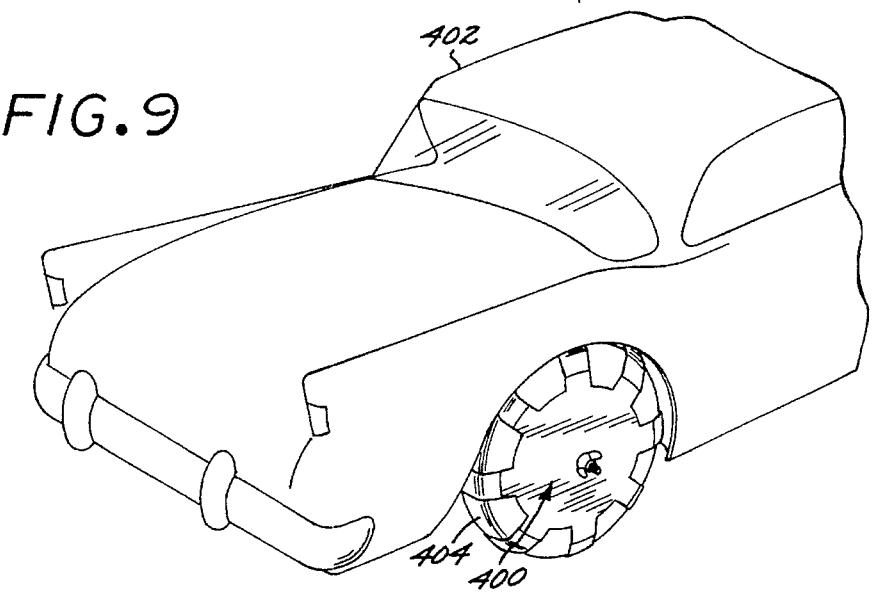
FIG. 9 illustrates a traction device embodying an adjustable wheel coupling according to the invention mounted on a rear drive wheel of an automotive vehicle.
Figure 10:
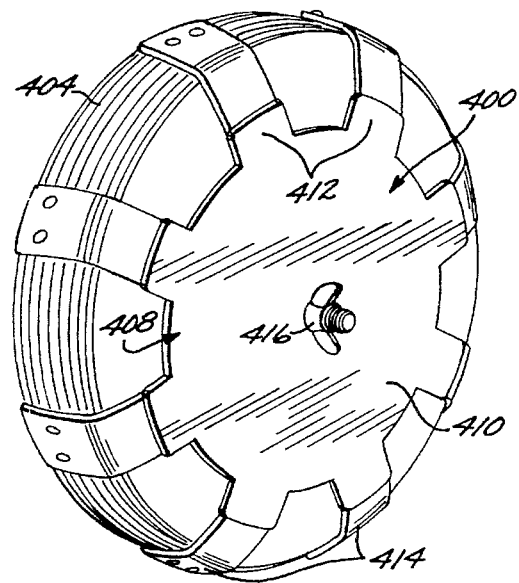
FIG. 10 is an enlarged perspective view of the wheel and traction device in FIG. 9.
Figure 11:
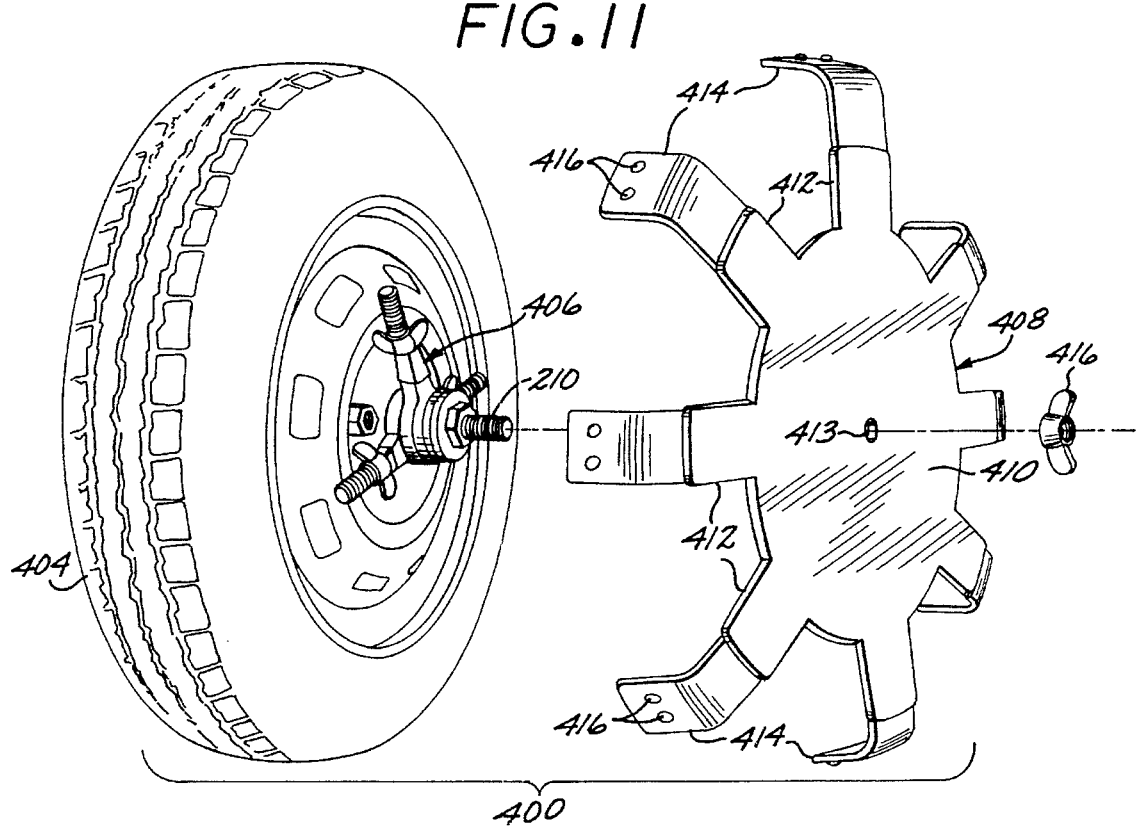
FIG. 11 is an exploded perspective view of the wheel and traction device in FIG. 10.

Turning now to FIGS. 9–11, there is illustrated a snow and ice traction device 400 to be mounted on the wheels of an automotive vehicle 402 to provide the vehicle with improved traction when driving over snow or ice covered surfaces. FIG. 9 illustrates traction devices 400 (only one shown) mounted on the rear drive wheels 404 of the vehicle. The traction devices are identical and each comprises an adjustable wheel coupling 406 according to the invention and a traction unit 408 proper.

The traction unit is similar to the traction unit of the SPIKES-SPIDER traction device mentioned earlier, As noted in the earlier discussion of the SPIKES-SPIDER traction device, the latter comprises a traction unit proper and a hub to which the traction unit is releasably secured by a removable lock ring. The hub has openings to receive auxiliary lug bolts to be threaded in auxiliary lug nuts threaded on the wheel lug bolts in place of the standard lug nuts for securing the hub to the wheel. Spacers are mounted on the auxiliary lug bolts between the wheel and the traction hub to locate the hub axially beyond the outer end of the wheel bearing.

The traction unit 408 of the present traction device 400, like that of the SPIKES-SPIDER traction device, has a central disc portion 410 and a number of generally radially extending traction arms 412 uniformly spaced about the circumference of the disc portion. Extending through the center of the disc portion 410 is a small hole 413. The traction arms 412 have right angle bends and free end portions 414 which extend laterally beyond the normally inner side of the central disc porition 410. The central disc portion 410 and the radially inner end portions of the traction arms 412 are relatively rigid and preferably fabricated in one integral piece, as by a plastic molding process. As in the existing SPIKES-SPIDER traction device, the outer ends 414 of the traction arms 412 are preferably separately fabricated from plastic or other suitable material and are rigidly joined in any convenient way to the integral inner end portions of the traction arms. Also, as in the SPIKES-SPIDER traction device, the outer arm ends 414 are preferably relatively stiff but somewhat flexible in the radial direction of the traction unit and mount traction studs 416.

The preferred wheel coupling 406 for use in the traction device 400 is the wheel coupling 200 of FIG. 6. Accordingly, the illustrated traction wheel coupling 406 is identical to the wheel coupling 200 and is mounted on the vehicle wheel 404 in the same manner as the earlier described wheel couplings of the invention. The central threaded stem of the coupling 406 is designated by the same reference numeral, 210, as the stem of the wheel coupling 200. The traction unit 408 is mounted on the vehicle wheel 404 by sliding the unit over the threaded stem 210 of the wheel coupling 406 with the stem extending through the hole 413 in the traction unit and then threading a wing nut 416 on the stem and tightly against the traction unit to firmly secure the unit to the coupling. The traction unit 408 is sized so that when thus mounted on the wheel 404, the outer right angle ends 414 of the traction arms 412 extend laterally inward across the tire tread in close proximity to or in contact with the tread. During travel of the vehicle 402 across an ice or snow surface, the traction arm ends 414 are gripped between surface and the tread of the wheel in such a way that the traction unit increases the vehicle traction even though the traction unit is not mechanically secured against rotation relative to the wheel.

Figure 12:
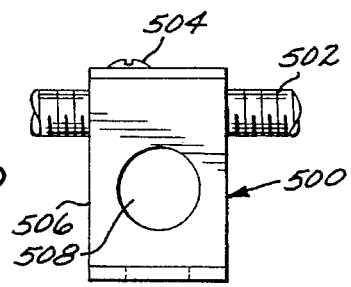
FIGS. 12 and 13 illustrate a modified mounting bracket for the adjustable wheel coupling of the invention.
Figure 13:
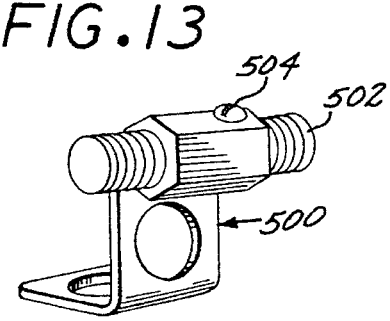

FIGS. 12 and 13 illustrate a modified mounting bracket 500 for an adjustable wheel coupling according to the invention. This modified bracket is identical to the mounting brackets 58 described earlier except for the following differences. The modified bracket is threaded on its respective mounting arm 502 rather than being slidable on the arm as are the earlier brackets 58. The modified bracket is thus adjusted along its mounting arm by rotating the bracket on the arm rather than by sliding the bracket along the arm. The bracket has a set screw 504 which may be tightened against the mounting arm to secure the bracket in fixed position along the arm. A wheel coupling embodying mounting brackets of the kind illustrated in FIGS. 12 and 13 will have radial index marks (corresponding to radial index marks 112 in FIGS. 1–3A) spaced along the bracket mounting arms in such a way that the brackets can be properly radially positioned along the arms with the aid of the gauge 66 by aligning the radially outer sides of the brackets with the radial index marks corresponding to the indicated guage marks determined by use of the guage in the manner described earlier.

Figure 14:
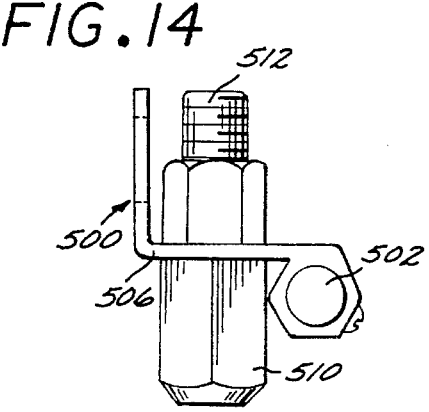
FIG. 14 illustrates how an extension lug can be used with the mounting bracket of FIGS. 12 and 13 to mount a wheel coupling of the invention on a wheel, such as a truck wheel, having deeply recessed lug bolts.

One other difference between the mounting bracket 500 and the earlier described mounting brackets resides in the fact that the leg 506 of bracket 500 contains a hole 508. This opening permits an adjustable wheel coupling according to the invention embodying the modified brackets to be mounted on a wheel, such as a truck wheel, having deeply inset lug bolts. In this case the mounting brackets are connected to the inset lug bolts by rotating the brackets 90 degrees to the position of FIG. 14 and connecting the brackets to the lug bolts by extension lugs 510 having threaded stems extending through the bracket leg holes 508 and extension lug nuts 512 threaded on the stems, as shown in FIG. 14.

I claim:

1. A wheel coupling for attaching a vehicular device to a vehicle including a rotary wheel support hub having a hub rotation axis and lug bolts spaced circumferentially about said axis, and a wheel coaxially mounted on said hub having a central hub portion containing openings receiving said lug bolts, respectively, said wheel coupling comprising:

a coupling part having a coupling axis and including coupling means for attachment to said vehicular device, mounting brackets spaced circumferentially about said coupling part including means for connecting said brackets to vehicle lug bolts, mounting means mounting said brackets on said coupling part in a manner which permits at least one of the following bracket adjustments: (a) adjustment of said brackets about said coupling axis, (b) adjustment of said brackets toward and away from said coupling axis.

2. A wheel coupling according to claim 1 wherein:

said means for connecting said brackets to vehicle lug bolts comprise a first hole in each bracket for receiving a vehicle lug bolt, a second hole in each bracket for receiving a lug bolt extension secured to a vehicle lug bolt.

3. A wheel coupling according to claim 1 wherein:

said mounting means permits both said adjustment (a) and said adjustment (b) and includes means permitting adjustment (a) without disengagement of said brackets from said mounting means and means permitting said adjustment {b} without disengagement of said brackets from said mounting means.

4. A wheel coupling according to claim 3 wherein:

said means for attaching said brackets to vehicle lug bolts comprise holes in said brackets for receiving one of the following: (a) vehicle lug bolts, (b) lug bolt extensions.

5. A wheel coupling according to claim 3 including:

indexing means on said coupling for aiding positioning of said brackets relative to said coupling axis.

6. A wheel coupling according to claim 3 including:

at least one of the following indexing means: (a) indexing means on said coupling part for aiding positioning of said mounting members about said coupling axis, (b) indexing means on said arms for aiding positioning of said brackets radially of said couplings axis.

7. A wheel coupling according to claim 6 wherein:

at least certain of said arms are rotatable arms which are rotatably adjustable relative to said coupling part, said indexing means (a) comprises index marks spaced about said coupling part, and said indexing means (b) comprises index marks spaced along each arm.

8. A wheel coupling according to claim 3 wherein: said coupling part comprises rotary bearing means aligned on said coupling axis and including a bearing member for connection to said vehicular device.

9. A wheel coupling according to claim 8 wherein:

said rotary bearing means comprises a bearing housing in which said bearing member is rotatably supported with the bearing member accessible externally of said housing for connection to said vehicular device.

10. A wheel coupling according to claim 9 wherein:

said bracket mounting means comprises bracket mounting arms including a first arm and a number of additional arms extending radially of said coupling axis and having radially inner and outer ends, means securing the inner end of said first arm to said bearing housing, means rotatably supporting the inner ends of said additional arms on said housing for rotation on said coupling axis relative to said housing to effect said bracket adjustment (a), and means mounting said brackets on said arms for adjustment along the arms to effect said bracket adjustment (b).

11. A wheel coupling according to claim 3 wherein:

said coupling part comprises a shaft aligned on said coupling axis.

12. A wheel coupling according to claim 1 wherein:

said mounting means comprise bracket mounting arms extending generally radially of said coupling axis and each having radially inner and outer ends, connecting means joining the inner ends of said arms to said coupling part, and means mounting said brackets on said arms.

13. A wheel coupling according to claim 1 wherein:

said mounting means comprise bracket mounting arms extending generally radially of said coupling axis and each having radially inner and outer ends, connecting means joining the inner ends of said arms to said coupling part in a manner which permits rotation of each arm about said coupling axis to effect said bracket adjustment (a), and means mounting said brackets on said arms.

14. A wheel coupling according to claim 1 wherein:

said coupling part comprises a rigid coupling body, said mounting means comprise bracket mounting arms including a first arm and additional arms extending generally radially of said coupling axis and each having radially inner and outer ends, means rigidly joining the inner end of said first arm to said coupling body for rotation of said first arm and said coupling body in unison on said coupling axis, means rotatably mounting the inner end of each said additional arm on said coupling body for rotation of each said additional arm on said coupling axis relative to said coupling body and first arm to effect said bracket adjustment (a), and means mounting said brackets on said arms.

15. A wheel coupling according to claim 1 wherein:

said mounting means comprise bracket mounting arms extending generally radially of said coupling axis and each having radially inner and outer ends, connecting means joining the inner ends of said arms to said coupling part, and means movably mounting said brackets on said arms for adjustment along the arms generally radially of said coupling axis to effect said bracket adjustment (b).

16. A wheel coupling according to claim 1 wherein:

said mounting means comprise threaded bracket mounting arms extending generally radially of said coupling axis and each having radially inner and outer ends, connecting means joining the inner ends of said arms to said coupling part, and means on said brackets threaded on said arms for threaded adjustment of said brackets along said arms generally radially of said coupling axis to effect said bracket adjustment (b).

17. A wheel coupling according to claim 16 including:

means for releasably securing said brackets in fixed positions along said arms.

18. A wheel coupling according to claim 1 wherein:

said mounting means comprise bracket mounting arms extending generally radially of said coupling axis and each having radially inner and outer ends, connecting means joining the inner ends of said arms to said coupling part, and means on said brackets slidable on said arms for slidable adjustment of said brackets along the arms generally radially of said coupling axis to effect said bracket adjustment (b).

19. A wheel coupling according to claim 18 including:

means for releasably securing said brackets in fixed positions along said arms.

20. A wheel coupling according to claim 1 wherein:

said mounting means comprises bracket mounting arms extending generally radially of said coupling axis and each having radially inner and outer ends, connecting means joining the inner ends of said arms to said coupling part in a manner which permits rotation of each arm about said coupling axis to effect said bracket adjustment (a), and means movably mounting said brackets on said arms for adjustment of said brackets along the arms generally radially of said coupling axis to effect said bracket adjustment (b).

21. A wheel coupling according to claim 1 wherein:

said mounting means comprise threaded bracket mounting arms extending generally radially of said coupling axis and each having radially inner and outer ends, connecting means joining the inner ends of said arms to said coupling part in a manner which permits rotation of each arm about said coupling axis to effect said bracket adjustment (a), and means on said brackets threaded on said arms for threaded adjustment of said brackets along the arms generally radially of said coupling axis to effect said bracket adjustment (b).

22. A wheel coupling according to claim 1 wherein:

said mounting means comprises bracket mounting arms extending generally radially of said coupling axis and each having radially inner and outer ends, connecting means joining the inner ends of said arms to said coupling part in a manner which permits rotation of each arm about said coupling axis to effect said bracket adjustment (a), and means slidably mounting said brackets on said arms for adjustment of said brackets along said arms generally radially said coupling axis to effect said bracket adjustment (b).

23. A wheel coupling according to claim 1 wherein:

said coupling part comprises a rigid coupling body, and said mounting means comprise bracket mounting arms including a first arm and additional arms extending generally radially of said coupling axis and each having radially inner and outer ends, means rigidly joining the inner end of said first arm to said coupling body, means rotatably mounting the inner end of each said additional arm on said coupling body for rotation of each said said additional arm on said coupling axis relative to said coupling body and said first arm to effect said bracket adjustment {a}, means mounting said brackets on said arms for adjustment along the arms generally radially of said coupling axis to effect said bracket adjustment {b}, and means for releasably securing said brackets in fixed positions along said arms.

24. A wheel coupling according to claim 1 wherein:

said coupling part comprises a rigid coupling body, and said mounting means comprise threaded bracket mounting arms including a first arm and additional arms extending generally radially of said coupling axis and each having radially inner and outer ends, means rigidly joining the inner end of said first arm to said coupling body, means rotatably mounting the inner end of each said additional arm on said coupling body for rotation of each said additional arm on said coupling axis relative to said coupling body and said first arm to effect said bracket adjustment (a), means on said brackets threaded on said arms for adjustment of said brackets along the arms generally radially of said coupling axis to effect said bracket adjustment (b), and means for releasably securing said brackets in adjusted positions along said arms.

25. A wheel coupling according to claim 1 wherein:

said coupling part comprises a rigid coupling body, and said mounting means comprise bracket mounting arms including a first arm and additional arms extending generally radially of said coupling axis and each having radially inner and outer ends, means rigidly joining the inner end of said first arm to said coupling body, means rotatably mounting the inner end of each said additional arm on said coupling body for rotation of each said additional arm on said coupling axis relative to said coupling body and said first arm to effect said bracket adjustment (a), means on said brackets slidable on said arms for adjustment of said brackets along the arms generally radially of said coupling axis to effect said bracket adjustment (b), and means for releasably securing said brackets in fixed positions along said arms.

26. A vehicle hitch for attachment to two laterally opposite wheels of a vehicle comprising:

a hitch frame including a pair of frame arms for straddling said vehicle wheels, wheel couplings mounted on said frame arms for attaching said arms to said vehicle wheels, and wherein each said wheel coupling comprises a coupling part having a coupling axis and including bearing means connecting said coupling part to the adjacent hitch frame arm for relative rotation of the coupling and arm on said coupling axis, mounting brackets spaced circumferentially about said coupling part each including means for connection to a vehicle lug bolt, and bracket mounting means movably mounting said brackets on said coupling part in a manner which permits the following bracket adjustments without disengagement of the brackets from the mounting means: (a) adjustment of said brackets about said coupling axis, (b) adjustment of each bracket toward and away from said coupling axis.

27. A vehicle hitch according to claim 26 wherein: said mounting means includes means for permitting said adjustment (a) without disengagement of said brackets from said mounting means, and means for permitting said adjustment (b) without disengagement of said brackets from said mounting means.

28. A hitch according to claim 26 wherein:

said mounting means comprises bracket mounting arms extending generally radially of said coupling axis and each having radially inner and outer ends, connecting means joining the inner ends of said arms to said coupling part in a manner which permits rotation of said arms about said coupling axis to effect said bracket adjustment (a) without disengagement of said brackets from said mounting means, and means movably mounting said brackets on said arms in a manner which permits adjustment of said brackets along the arms generally radially of said coupling axis to effect said bracket adjustment (b) without disengagement of said brackets from said mounting means.

* * * * *